C. E. HUTCHINGS.
PHOTOGRAPHIC CAMERA.
APPLICATION FILED OCT. 22, 1906.
932,392.
Patented Aug. 24, 1909.
4 SHEETS—SHEET 1.
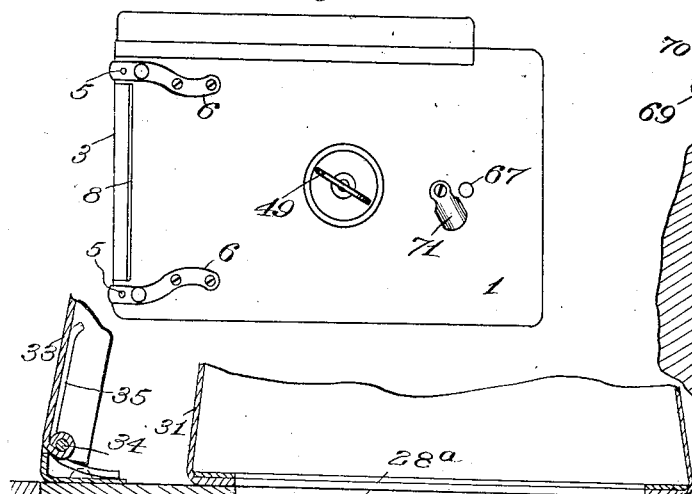
Fig. 1.
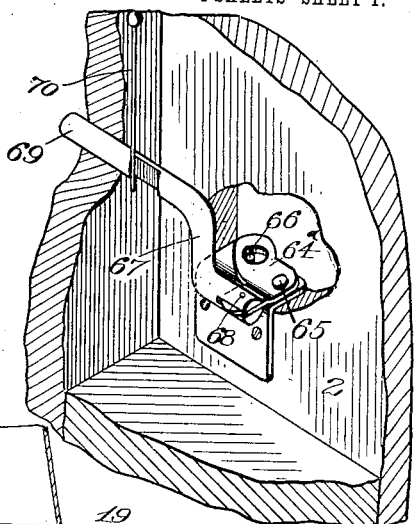
Fig. 9.
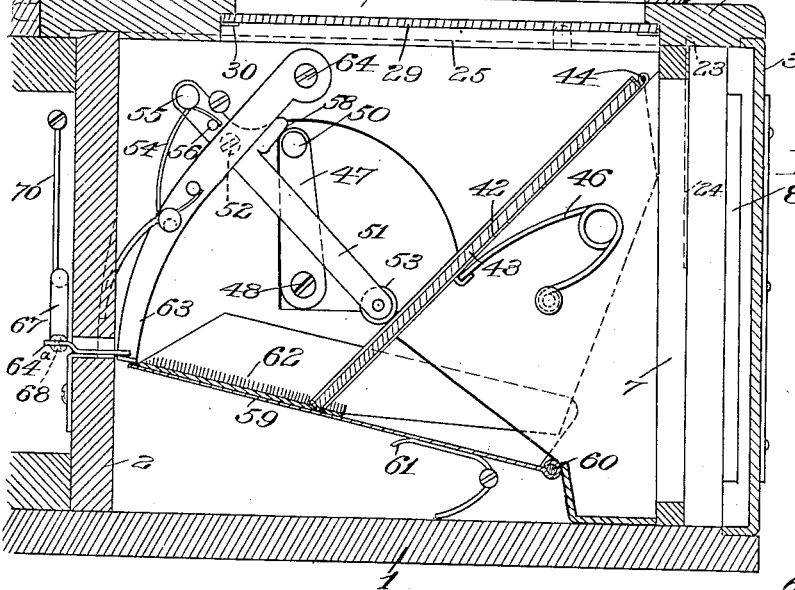
Fig. 5.
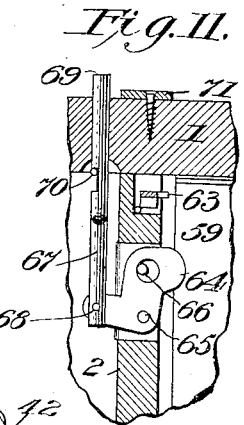
Fig. 11.
Fig. 8.
Witnesses
Walter B. Payne
Flurne E. French
Inventor
Charles E. Hutchings
By Church & Rich
his Attorneys

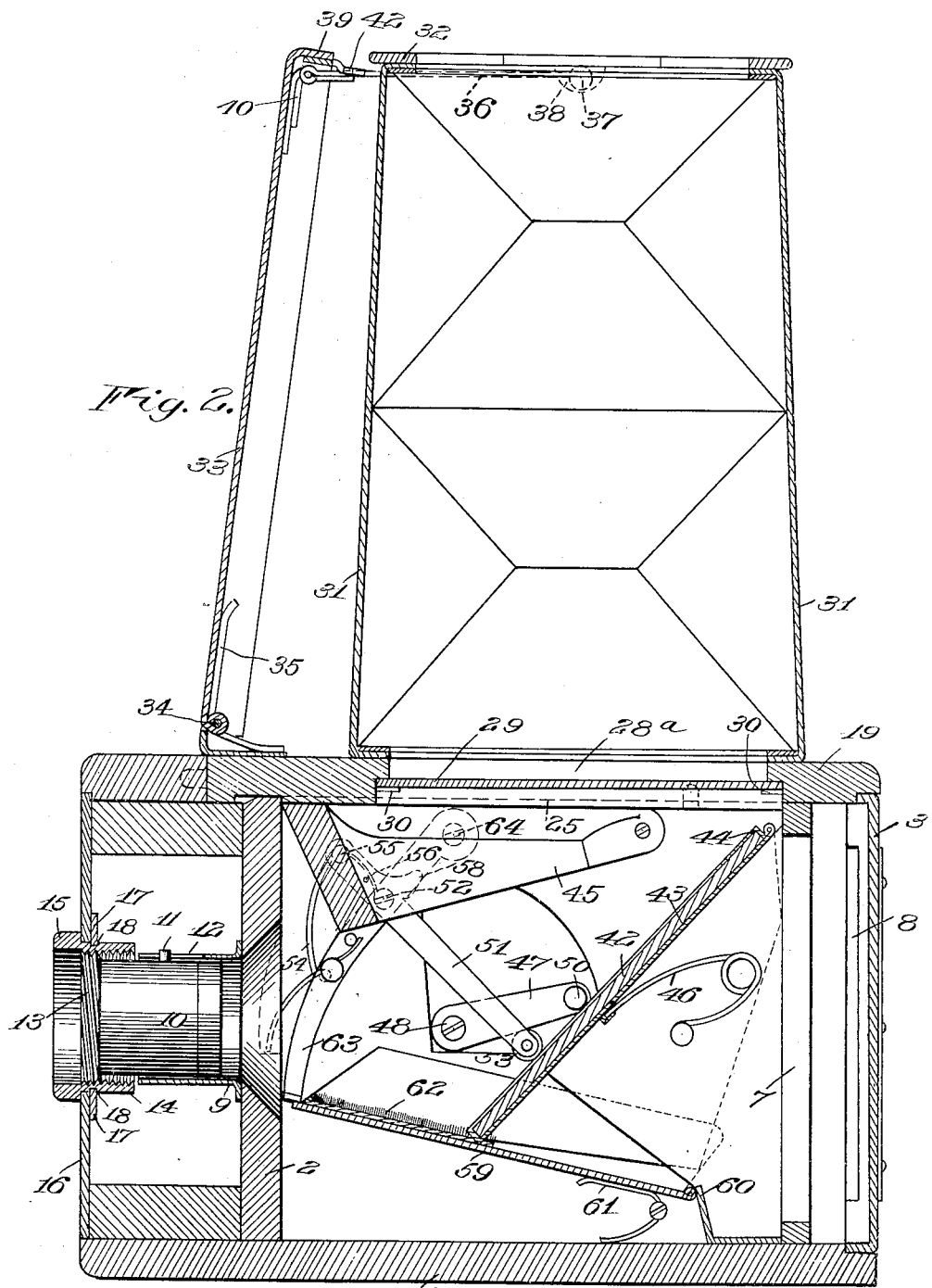

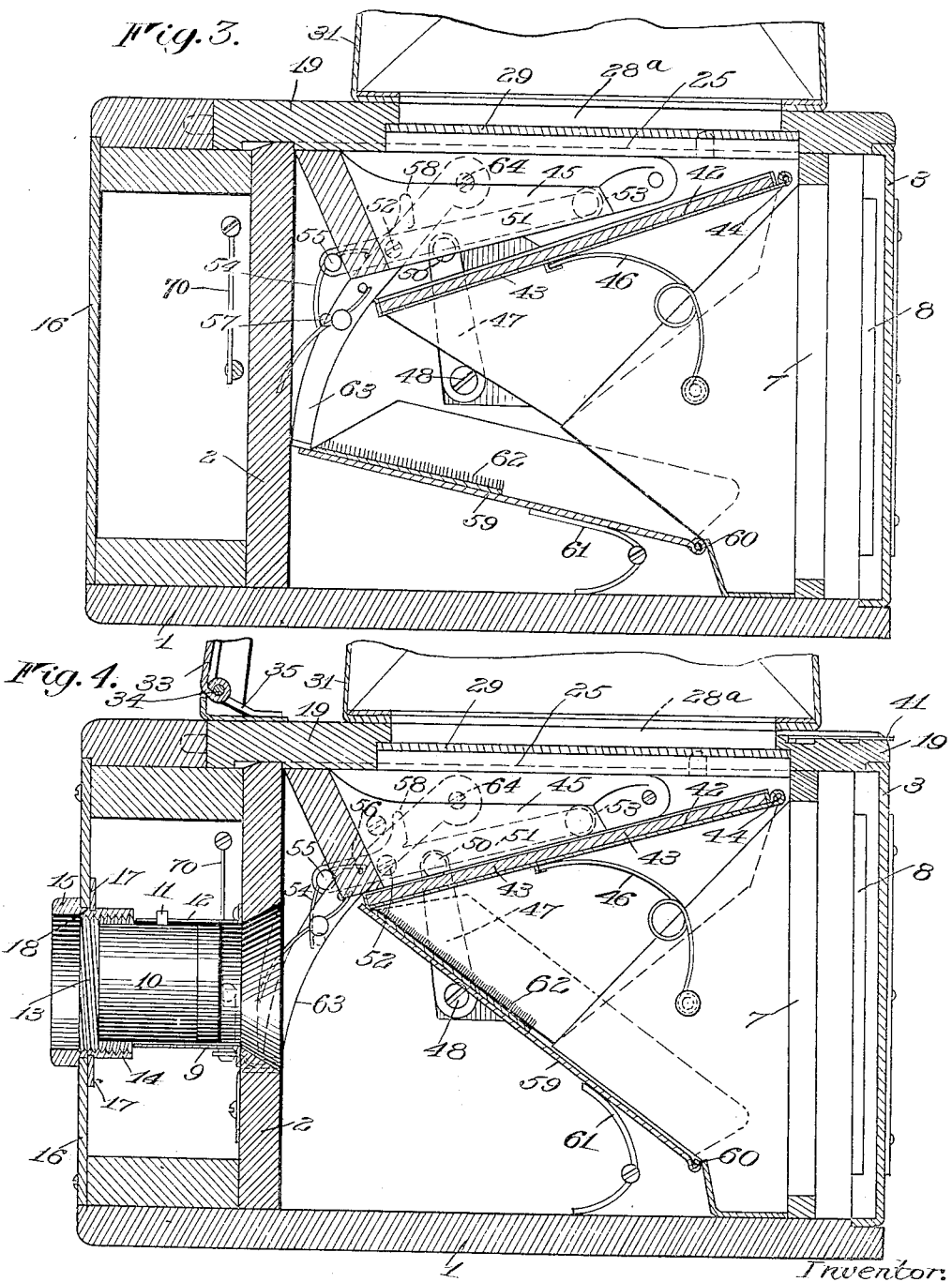

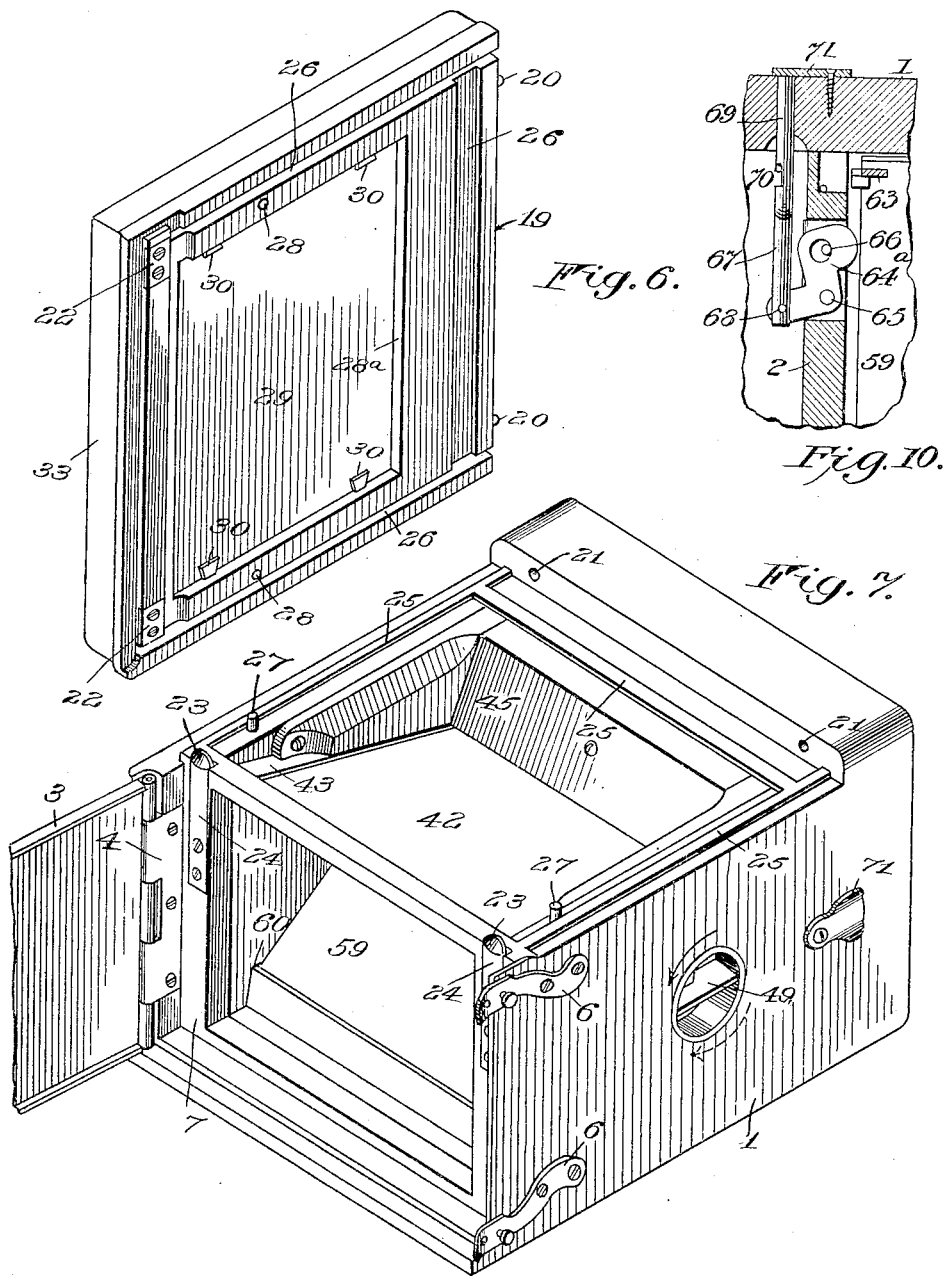

UNITED STATES PATENT OFFICE.

CHARLES E. HUTCHINGS, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC CAMERA.

932,392.  Specification of Letters Patent.  Patented Aug. 24, 1909.

Application filed October 22, 1906. Serial No. 339,911.

*To all whom it may concern:*

Be it known that I, CHARLES E. HUTCHINGS, of Rochester, in the county of Monroe and State of New York, have invented certain new and useful Improvements in Photographic Cameras; and I do hereby declare the following to be a full, clear, and exact description of the same, reference being had to the accompanying drawings, forming a part of the specification, and to the reference-numerals marked thereon.

My present invention relates to improvements in cameras, and more especially to the type wherein the image from the lens is reflected on a screen so located that it may be viewed without disturbing the position of the sensitized medium, and the object of this invention is to provide an improved camera of this type wherein the focusing thereof with the aid of the view finder is facilitated, and the operation of the shutter and the reflector embodying part of the focusing device are so related and controlled that the exposures may be made in the best manner.

To these and other ends the invention consists in certain improvements and combinations of parts, all as will be hereinafter more fully described, the novel features being pointed out in the claims at the end of the specification.

In the drawings: Figure 1 is a side elevation of the exterior of a camera constructed in accordance with my present invention. Fig. 2 represents a vertical section of the camera with the parts in position for view-finding and focusing. Figs. 3 and 4 are sectional views similar to Fig. 2 showing respectively the positions of the parts immediately after the release of the reflector and before the closing of the shutter, and the relative position of the parts after the exposure has been completed. Fig. 5 is a view similar to Figs. 3 and 4, showing the parts in position for a time exposure. Fig. 6 is a perspective view of the under side of the frame supporting the detachable hood adapted to be employed for view-finding and focusing. Fig. 7 is a perspective view of the camera showing the attaching devices arranged to coöperate with the hood frame, and also showing the chamber adapted to contain the sensitized medium. Fig. 8 is a detail section showing the bellows and coöperating parts in collapsed position, and Fig. 9 is a detail view of the time exposure stop. Figs. 10 and 11 are detail sections through the camera casing showing two positions of the time exposure stop.

Similar reference numerals in the several figures indicate similar parts.

The camera shown in the present embodiment of my invention comprises a box or casing 1 so constructed as to exclude light, and having a chamber formed therein to contain the parts of the shutter mechanism and the view-finding reflector, a septum 2 being arranged in the front of the box for positioning the lens, and the rear thereof being suitably adapted to receive the sensitized medium to be exposed. In the present instance the camera is arranged to receive the ordinary film packs, the rear of the camera being provided with a door or panel 3 which is preferably hinged at 4 to one side of the camera, and having projections 5—5 on its movable edge adapted to engage and coöperate with the correspondingly-arranged spring latches 6 secured to the camera side, these latches being adapted to be engaged by the photographer's fingers to disengage the projections and permit opening of the door or panel. The latter serves to inclose the film pack between it and a flange 7 provided in the camera in rear of the shutter, and a slot 8 is formed between the door and camera casing to permit the passage of the tabs of opaque material after each exposure.

The septum 2 in the front of the camera is provided with an aperture to permit passage of the light and in alinement therewith is secured a tube or sleeve 9 adapted to receive the lens element 10, the latter having a projection 11 arranged to coöperate with an axial slot 12 formed in the tube. The forward end of the lens element 10 is provided with a threaded shoulder 13 adapted to coöperate with an internally threaded adjusting sleeve or member 14, the latter having an operating portion 15 thereon arranged at the front of the removable cover plate 16, and the adjusting member is guided or journaled in the cover plate by means of segmental plates 17 having their inner edges resting in a circumferential groove 18 formed in the adjusting member. Rotation of the latter may be conveniently accomplished by manipulation of the exteriorly-arranged operating portion thereof, and this serves to adjust the position of the lens in the direction of its axis, rotation of the lens being prevented by the coöperative relation between the projection 11 and the slot 12.

The top of the camera casing is preferably detachable in order to render the interior parts of the camera accessible, and in the present instance, this removable top is utilized as the supporting frame 19 for the focusing or view-finder hood, the frame being provided at one edge with projections 20 arranged to engage and disengage the recesses 21 of the casing by a relative tilting movement of the latter and the frame, and the free edge of the latter is detachably locked in position by catches, embodying in the present instance locking plates 22 on the frame adapted to coöperate with the projections 23 formed on the springs 24 secured to the camera casing, these catches being readily disengaged from the locking plates by pressing the springs out of engagement therewith, while the beveled surfaces on the locking projections serve to effect a latching action of the catches which automatically locks the frame when the latter is moved into closed or fastened position. In order to insure the exclusion of light from the joint between the frame and casing, the latter is preferably provided with ribs 25 adapted to register with the grooves 26 on the under side of the detachable frame, and if desired, pins 27 may be provided on the casing and arranged to coöperate with the recesses 28 of the frame to insure the security thereof and guide these parts while moving into engagement. This frame is provided with a recess 28ª to receive and contain a suitable focusing screen, an ordinary ground glass 29 being employed in the present instance which is held in position by the staples or projections 30, and this screen is preferably arranged in a plane substantially parallel to the optical axis of the lens in order that the camera may occupy a horizontal position and the image on the screen may be viewed from above.

To the upper surface of the frame 19 is secured a bellows 31 (see Fig. 2) which surrounds the opening through the frame, and the upper end of the bellows is provided with a cap 32 having an observation aperture through which the image on the ground glass or screen may be viewed. On the frame 19 at one side of the bellows is mounted a device which, when in closed position, serves to inclose the bellows between it and the top of the frame 19, and which also serves to operate the bellows, this device in the present instance embodying a cover 33 pivoted to the frame at 34 and having a spring 35 acting thereon to open the cover, that is to say, to move it into a position substantially at right angles to the top of the camera, and at that edge of the cover opposite to the hinged edge is provided a yoke 36, the latter having its arms arranged on opposite sides of the bellows and attached by the bearings 37 on the ends of these arms to the projections 38 on the cap 32 of the bellows. The body portion of this yoke is pivotally attached by the hinge 39 to the cover, a spring 40 normally operating to swing the yoke in a position that will open or draw out the bellows into the position shown in Fig. 2. When the cover is closed and the bellows is collapsed, a spring-actuated latch 41 on the frame serves to engage the notched projection 42 on the edge of the cover to retain the latter in closed position, as shown in Fig. 8, so that the camera is compact for transportation and the bellows and its coöperating parts are protected. When it is desirable to bring the bellows into operation, it is merely necessary to operate the latch 41 by the finger, and this will release the projection 42 and permit the cover to swing into open position under the action of the spring 35, and the yoke 36 under the action of its spring will operate to draw out the bellows and hold it in extended position, and this enables the photographer to obtain a view of the image on the screen, in order that the picture to be taken may be placed as desired on the negative, and in order to enable the lens to be brought into focus. The latter operation may be readily accomplished by rotation of the operating portion 15 of the lens-adjusting sleeve, the threaded engagement between the latter serving to adjust the lens in the direction of its axis.

In this application no claim is made for the bellows and its operating mechanism, as these parts form the subject matter of a divisional application, filed by me on April 8, 1907, and serially numbered 366,940.

During the focusing or view-finding operations, the image from the lens is diverted from the original axis, and directed on the screen by a suitable reflector 42 carried on a member 43 which is adjustable so as to clear the optical field while the exposure is being made, and in the present instance this reflector controls and forms a part of a shutter for determining the exposures of the sensitized medium. This member 43 is pivoted to the camera casing at 44 and arranged to swing into and out of coöperative relation with a seating 45, which surrounds the light opening formed by the focusing screen, during the exposing operation, and is adapted to occupy a suitable position such as that shown in Fig. 2 during the focusing or view-finding operation, the angular position of the reflector being such that the image from the lens will be cast on the screen with the same focus and in similar arrangement as when it is directed on the sensitized medium. This member is operated on by a spring 46 which normally tends to swing the member clear of the optical field and into engagement with the seating 45 so as to prevent entrance of light to the camera chamber through the screen, and this member is set in focusing position by means of an arm 47 secured to a shaft 48 extending through the side of the camera casing and provided with an exteriorly-arranged thumb piece or operating handle 49, the free end of the arm being provided with a roller or projection 50 arranged to coöperate with the surface of the member. The latter is normally retained in such a position by means of a detent 51 pivoted intermediately as at 52 and having a roller or projection 53 at one end arranged to coöperate with the upper or forward surface of the member, the opposite end of the detent being provided with a spring 54 encircling a pin 55 on the detent and having its ends engaging respectively the projection 56 on the detent and the projection 57 on the camera casing. This spring operates to retain the roller or projection 53 on the detent in coöperative relation with the pivoted member 43, and as the latter is swung into focusing position this detent will assume a position substantially perpendicular to the surface of said member, as shown in Fig. 2, and the detent will thus serve to retain this member and the reflector thereon in focusing position. The operating spring of the detent, however, is not sufficiently strong to retain this member in opposition to its spring when said member occupies positions other than the focusing position, and the detent is provided with a lateral projection or bell crank arm 58 arranged in the path of the roller or projection 50 on the operating device, and when the latter is rotated in a reverse direction from that required to set the member 43, the projection thereon will coöperate with the projection 58 of the detent, displacing the latter from a perpendicular position relatively to the surface, or in other words, shifting it from its center and thus permitting the member 43 to swing into exposing position and against the seating 45 to exclude light from the screen.

Mounted in coöperative relation with the upper shutter member is a lower member 59, the latter being pivoted to the casing at 60, and provided with a spring 61 which normally operates to move the lower member upwardly or into engagement with the upper member, the forward free edge of the latter being arranged to coöperate with and form a light tight fit with the upper surface of the lower member, a light excluding strip of felt or other suitable material 62 being preferably employed to insure sealing of the joint. After an exposure has been effected, the shutter members occupy a position similar to that shown in Fig. 4, and when the thumb piece 49 is operated to shift the reflector into focusing position, the forward edge of the upper member 43 depresses the lower member 59 by its coöperative engagement with the light-excluding strip thereon, and therefore during and after the setting movements of the shutter members the sensitized medium is protected from light. The lower shutter member moves downwardly until its forward edge passes the end of a latch 63, the latter being pivoted to the camera casing at 64 and having a portion so shaped and arranged as to be engaged by a portion of the upper shutter member when the latter approaches the limit of its upper movement, and thus serves to disengage its end and thereby release the lower shutter member, allowing the latter to swing upwardly until it again coöperates with the upper shutter member. These shutter members when so set, are adapted to produce instantaneous or so-called snap-shot exposures, the upper shutter member first moving upwardly and uncovering the lens so that it may expose the plate while the lower shutter member is detained in lowered position by the latch 63, and then immediately after the said latch has been engaged by the upper shutter member, it will release the lower shutter member, permitting it to move upwardly and terminate the exposure.

Time exposures may be provided for by mounting a stop in the septum 2 in an appropriate position to engage the lower shutter member and detain it after the upper shutter member has operated to begin the exposure, the stop employed in the present instance embodying a plate 64ª pivoted to the septum at 65 and having a rounded portion arranged to move into and out of the path of the adjacent edge of the lower shutter member, a limiting projection 66 serving to prevent undue movement thereof, and this stop is operated by a plunger 67 pivotally connected to the plate at 68 and having an operating portion 69 extending through and guided in the wall of the camera casing. A spring 70 operates on this plunger to normally move it outwardly and thereby set the stop in operative position, and when so set, the inclined relation of the surface of the lower shutter member engaging the stop causes a latching action of the latter when the said shutter member is moved into lowered position, so that a series of time exposures may be taken without requiring resetting of the stop for each exposure. However, when instantaneous exposures are to be taken the plunger 67 is held in such a position that the stop will clear the lower shutter member, and in the present instance a pivoted button or plate 71 is provided on the exterior of the camera casing and adapted to retain the plunger against the action of its spring.

In making time exposures, the button 71 is moved aside to release the plunger 67, the latter setting the stop in position to engage and retain the lower shutter member, and by rotating the thumb piece 49 in the direction shown by the arrow in full lines in Fig. 6, the lower shutter member will be engaged by the latch 63 and by the time stop, and by reversing the direction of rotation of the thumb piece or turning it in the direction indicated by the dotted arrow in the same figure, the detent 51 will be disengaged from the upper shutter member, permitting it to rise, beginning the exposure and disengaging the latch 63 from the lower shutter member so that the latter is then retained by the time stop. Whenever it is desired to terminate the exposure, this may be accomplished by pressing the plunger 67.

The novel construction and arrangement of the shutter members insures uniform exposure of all parts of the negative as both of the shutter members pass across the lens from the same side thereof and one in advance of the other, the exposure in this respect being similar to that obtained by the use of the so-called "focal plane" or flexible blind shutter, and by utilizing one of these shutters as a support for the reflector, the manipulation of a camera of the type herein shown is materially simplified and facilitated, as a single operation serves to move the reflector out of the optical field and to effect the exposure, and the setting of this reflector in focusing position also serves to set the shutter in readiness for the exposure.

The novel construction and arrangement of the focusing hood not only provides a very compact form for the camera when not being used, but the automatic opening and positioning devices for the bellows enables the operator to quickly bring the camera into focusing condition, and the focusing device for the lens may be conveniently manipulated from the exterior of the camera, although its parts are practically inclosed within the camera casing.

I claim as my invention:

1. In an optical device, the combination with a suitable casing having a lens therein, of shutter members coöperating in set position to interrupt light from the lens, and devices for operating them successively from the same side of the optical field to admit and interrupt the light from the lens.

2. In an optical device, the combination with a suitable casing having a lens therein, of a pair of shutter members mounted in coöperative relation with the lens, one of which is movable to permit the passage of light from the lens and the other of which is movable to interrupt the light; devices for moving the former of said members across the field of the lens to permit the passage of light relatively to the lens, and devices for subsequently operating the other shutter member across the optical field to interrupt the passage of light.

3. In a camera, the combination with the camera casing having a lens therein, and a focusing screen arranged out of line of the axis thereof, of shutter members coöperating in set position to interrupt light from the lens, means for operating one of said members transversely of the field of the lens to permit the passage of light relatively thereto, and into a position to cover said screen, and devices for subsequently operating another shutter member to interrupt the light.

4. In a camera, the combination with the camera casing having a lens therein and adapted to contain a sensitized medium in coöperative relation therewith, and a focusing screen arranged out of line with the said lens and medium, of a pair of shutter members normally arranged to interrupt the light between the lens and sensitized medium, one being movable to permit the passage of light to the medium and the other being movable to interrupt the light; means for operating the former of said members to cover said screen and begin an exposure, and devices for causing the other member to operate to terminate the exposure.

5. In a camera, the combination with the camera casing having a lens therein and suitable means for positioning a sensitized medium in coöperative relation therewith, of a pair of shutter members having their edges normally in coöperative relation at either side of the lens to cut off the light from the latter, and arranged to operate successively in a direction transversely of the field of the lens to effect an exposure of the sensitized medium.

6. In a camera, the combination with the camera casing having a lens therein, and adapted to contain a suitably positioned sensitized medium, of shutter members mounted in the casing having portions thereof normally in coöperative relation when said members are both at one side of the field of the lens in set position, a light-excluding device on one of said members and coöperating with a portion of the other member to prevent passage of light from the lens to the sensitized material, and devices for operating said members to effect exposures of the sensitized medium.

7. In a camera, the combination with the camera casing having a lens therein and adapted to contain a suitably positioned sensitized medium, of a pair of shutter members pivotally mounted in said casing and arranged to swing in planes substantially parallel to the axis of the lens, portions of said members normally coöperating in set position to cut off light between the lens and sensitized medium, and devices for operating said members across the field of the lens to effect the exposure of the medium.

8. The combination with a camera having a lens and adapted to contain a sensitized medium therein, of a pair of shutter members mounted therein, one of which is movable to effect exposure and the other to interrupt exposure, devices for moving the former of said members into coöperative relation with the other member to set the latter preparatory to an exposure, and devices for successively operating said members across the optical field to effect the exposure by the one first moving and to interrupt the exposure by the one last moving.

9. The combination with a camera casing having a lens therein, and adapted to contain a sensitized medium, of a shutter mounted in the casing embodying a pair of pivotal members, operating means for moving said members in one direction across the field of the lens, a setting device for moving one of said members into coöperative relation with the other member to set it preparatory to an exposure, and devices for successively releasing said members to effect an exposure.

10. The combination with a camera having a lens therein and adapted to contain a suitably positioned sensitized medium, of a shutter embodying a pair of relatively movable shutter members, means normally operating to move said members across the optical field toward exposed position, means for setting the members preparatory to an exposure, and devices for successively releasing said members.

11. The combination with a camera having a lens therein and adapted to contain a suitably positioned sensitized medium, of a shutter embodying a pair of relatively movable shutter members, one of which is movable to effect exposure and the other to interrupt exposure, means normally operating to move said members across the optical field toward exposed position, means for setting the members preparatory to an exposure, and a latch for retaining one of said members in set position and controlled by the movement of the other member toward exposed position.

12. The combination with a camera having a lens therein and adapted to contain a suitably positioned sensitized medium, of a shutter embodying a pair of relatively movable shutter members, one of which is movable to effect exposure and the other to interrupt exposure, means normally operating to move said members across the optical field toward exposed position, means for setting the members preparatory to an exposure, a latch for holding one of said members in set position and arranged to be released by the movement of the other member toward exposed position, and a releasing device for independently releasing one of said members.

13. The combination with a camera having a lens therein and adapted to contain a suitably positioned sensitized medium, of a shutter embodying a pair of relatively movable shutter members, means normally operating to move said members across the optical field toward exposed position, means for setting the members preparatory to an exposure, an independent retaining device for each member, one of said retaining devices being released by the movement of the opposing shutter member, and means for releasing the latter member.

14. The combination with a camera casing having a lens therein and adapted to contain a suitably positioned sensitized medium, of a shutter embodying a pair of relatively movable shutter members, means for setting them preparatory to an exposure, means for operating them to effect an exposure, a latch for automatically holding one of said members in set position and arranged to be released by engagement with a part on the opposing member after the latter has moved toward exposing position, a detent for holding the latter member in set position, and means for releasing the said detent.

15. The combination with a camera casing having a lens therein and adapted to contain a suitably positioned sensitized medium, of a shutter embodying a pair of relatively movable shutter members, a rotatable arm having a portion for moving said members to set position preparatory to an exposure, and a detent for preventing operation of said members and having a portion arranged to be engaged by the operating arm when the latter is operated to release it.

16. The combination with a camera casing having a lens therein and adapted to contain a suitably positioned sensitized medium, of a shutter embodying a pair of relatively movable shutter members, an operating device for setting the members in position preparatory to an exposure, a pivoted detent having a portion arranged to retain the shutter members when the latter are moved to set position, said detent having a lateral projection thereon arranged to be engaged by said operating device to release the shutter members.

17. The combination with a camera having a lens therein and adapted to contain a suitably positioned sensitized medium, of relatively movable shutter members arranged therein, means for setting them preparatory to an exposure, means normally operating to move them toward exposed position, a latch arranged to be released by the movement of one of the shutter members for holding the opposite shutter in set position, and a time stop arranged to detain the last named shutter member after the release of said latch.

18. The combination with a camera having a lens therein and adapted to contain a suitably positioned sensitized medium, of relatively movable shutter members arranged therein, means for setting them preparatory to an exposure, means normally operating to move them toward exposed position, a latch arranged to be released by the movement of one of the shutter members for holding the opposing shutter in set position, and a time stop having a latching engagement with the shutter member employing the latch for detaining it after the release of the latter.

19. The combination with a camera having a lens therein and adapted to contain a suitably positioned sensitized medium, of relatively movable shutter members arranged therein, means for setting them preparatory to an exposure, means normally operating to move them toward exposed position, a latch arranged to be released by the movement of one of the shutter members for holding the opposing shutter in set position, and a time stop embodying a pivoted plate having a latching engagement with the shutter member employing said latch, a plunger connected to the said plate and having a portion operable from the exterior of the camera casing, a spring normally operating to hold the stop in operative position, and a device accessible from the exterior of the camera casing for retaining the plunger to hold the stop out of operation.

20. The combination with a camera casing having a lens therein and adapted to position a sensitized medium in coöperative relation therewith, and a screen arranged in the casing out of line with the axis of the lens, of a shutter for controlling the exposures embodying two relatively movable members coöperating in set position to interrupt light from the lens, one of said members arranged to cover the said screen when it is in exposing position, and a device movable with said member in both directions for directing the rays from the lens on said screen when the member is in focusing position.

21. The combination with a camera casing having a lens therein and adapted to position a sensitized medium in coöperative relation therewith, and a screen arranged in the casing out of line with the axis of the lens, of a shutter for controlling the exposures embodying two relatively movable parts coöperating in set position to interrupt light from the lens, one of said members being movable to cover the said screen and begin the exposure.

22. The combination with a camera casing having a lens therein and adapted to position a sensitized medium in coöperative relation therewith, and a screen arranged in the casing out of line with the axis of the lens, of a shutter for controlling the exposures embodying two relatively movable parts coöperating in set position to interrupt light from the lens, and one of which has a reflector thereon for directing the rays from the lens on said screen when the member is in focusing position, and serving to cover or conceal said screen and begin the exposure of the sensitized medium when moved in exposing position.

23. The combination with a camera casing having a lens therein and adapted to position a sensitized medium in coöperative relation therewith, and a screen arranged in the casing out of line with the axis of the lens, of a shutter for controlling the exposures embodying relatively movable members coöperating in set position to interrupt light from the lens and movable transversely to the axis of the lens, and a reflector on one of said members for directing an image from the lens on said screen when said member is in focusing position, and serving to begin the exposure and to move out of the field of the lens.

24. The combination with a camera casing having a lens therein and adapted to contain a sensitized medium in optical relation to the lens, and a screen arranged in the casing out of line with the optical axis of the lens, of a spring-operated member serving to prevent exposure of the sensitized medium and having a reflector thereon adapted to direct the image from the lens onto the said screen when said member is in focusing position, a releasing device for permitting said member to expose the sensitized medium and to remove said deflector from the optical field, and a relatively movable means coöperating with said member for terminating the exposure.

25. The combination with a camera casing having a lens therein and adapted to contain a sensitized medium in optical relation to the lens, and a screen arranged in the casing out of line with the optical axis of the lens, of a member mounted to swing transversely to the axis of the lens and having a reflector thereon for directing an image from the lens upon said screen, means for moving said member to focusing and exposing positions, and a shutter member coöperating with said first mentioned member for controlling the exposure of the sensitized medium.

26. The combination with a camera casing having a lens therein and adapted to contain a sensitized medium in optical relation to the lens, and a screen arranged in the casing out of line with the optical axis of the lens, of a member having a reflector thereon and pivoted to swing the latter into focusing and exposing positions, the reflector serving to direct the image from the lens upon the screen when said member is in focusing position, and serving as a shutter member to expose the sensitized medium when moved to exposing position, and a coöperating shutter member for controlling the exposures.

27. The combination with a camera casing having a lens therein and adapted to contain a sensitized medium in optical relation to the lens, and a screen arranged in the casing out of line with the optical axis of the lens, of a member having a reflector thereon and pivoted to swing the latter into focusing and exposing positions, a spring normally operating to move said member out of the field of the lens, a setting device for moving the said member into focusing position, and a pivoted detent arranged to swing parallel to the plane of movement of said member and arranged to hold the latter in focusing position, a portion on the detent being arranged to be engaged by said setting device and thereby operated to release the said member.

28. In a camera, the combination with a camera casing having a lens therein and adapted to contain a suitably positioned sensitized medium, of a frame, coöperating ribs and depressions on said frame and the camera casing and devices for detachably fastening said frame to the casing, a focusing screen and bellows carried by the frame and a cover for the bellows hinged to the frame.

CHARLES E. HUTCHINGS.

Witnesses:
 JOHN A. ROBERTSON,
 CLARENCE A. BATEMAN.